United States Patent [19]

Ishikawa et al.

[11] Patent Number: 4,912,495
[45] Date of Patent: Mar. 27, 1990

[54] LIGHT MEASURING DEVICE

[75] Inventors: Masanori Ishikawa; Akira Yamada; Shuichi Kiyohara; Masao Shimizu; Yoshihiko Aihara, all of Kanagawa, Japan

[73] Assignee: Canon Kabushiki Kaisha

[21] Appl. No.: 198,650

[22] Filed: May 24, 1988

Related U.S. Application Data

[63] Continuation of Ser. No. 870,243, Jun. 3, 1986.

[30] Foreign Application Priority Data

Jun. 6, 1985 [JP] Japan ................. 60-123052

[51] Int. Cl.$^4$ ............................................. G03B 3/00
[52] U.S. Cl. .................................... 354/402; 354/432
[58] Field of Search ............... 354/429, 431, 432, 481, 354/286

[56] References Cited

U.S. PATENT DOCUMENTS

| 3,762,286 | 10/1973 | Masegawa | 354/432 |
| 4,306,787 | 12/1981 | Fukuhara et al. | 354/432 |
| 4,391,500 | 7/1983 | Tsunekawa | 354/433 |
| 4,477,164 | 10/1984 | Nakai et al. | 354/286 |
| 4,636,054 | 1/1987 | Saegusa | 354/432 |

Primary Examiner—Russell E. Adams
Attorney, Agent, or Firm—Toren, McGeady & Associates

[57] ABSTRACT

A light measuring device in which the field of a photometric system is divided into a plurality of areas, and the outputs of these areas are computed based on the one of various formulae which is selected depending on the relative size of the subject image to the total field as the focal length of a photographic lens varies, to obtain an exposure value.

25 Claims, 9 Drawing Sheets

LIGHT MEASURING DEVICE

This is a continuation of application Ser. No. 870,243, filed June 3, 1986.

BACKGROUND OF THE INVENTION

1. Field of the Invention

This invention relates to a light measuring device having a multiple segmented photosensor with a plurality of computation formulae.

2. Description of the Related Art

Of the light measuring methods, the most common ones are the averaged overall light reading and the partial light reading. In the former, the various portions of the entire field of the photosensor are integrated to get an average of their different degrees of brightness. When the subject of principal interest is far dimmer than its environment, as in a back-lit scene, a proper exposure for the subject can be hardly obtained. The latter reading is able to isolate each of the portions of the scene, and, therefore, is suited for to determining the exposure based on the brightness of the subject. Because the light measuring area is of a fixed relative size to the entire area of the image frame, however, if the subject image occupies a small fraction of the photometric area, the determination of an exposure will be unavoidably influenced by the brightness of the background of the scene. Also, to desire a balanced exposure over the entire area of the image frame by mental summing and averaging technique, the partial light reading is not very useful. So, a camera having these two aspects of the light reading has been developed. But, since the choice of the better one of the two light measuring modes to a given scene depends on the insight and experience of the photographer, for the beginner, the camera became only harder to handle, rather troublesome, and was often mismanaged.

Recently, there has been proposed a light measuring device having a multiple segmented photosensor with an evaluation circuit receptive of the outputs of all the segments for obtaining a brightness distribution over the area of the image frame and responsive to this brightness distribution for determining an exposure suited to the scene. But, in this case also, since the relative size which the subject had to the image frame was ignored, the brightness of the subject was, similarly to the above-described partial light reading, not always primarily reflected is the exposure. Therefore, photographers could not take the light measurement with emphasis on a particular section of the scene. In more detail, as the size of the subject such as a person changes largely between landscape and portrait photography which are generally encountered, it was impossible to set that light measuring device in the mode suited to attain a best result of exposure of the subject.

Meanwhile, when the subject lies near or at the minimum distance, the back-lit situation of it is rarely encountered. For the subject distance of 1.5 to 3 meters, the possibility of encountering back-lit situations is high. On this account, a light measuring device capable of changing over between modes in response to object distance information has been developed as, for example, disclosed in Japanese Laid-Open Patent Applications No. SHO 56-102838 and No. SHO 58-12571.

Since, in such a proposal, however, the selection of the light measuring modes was made dependent only on the photographic distance, for, as the same subject at the same distance was shot, the focal length of the photographic lens varied in a wide range, even if the distance was the minimum, the possibility of occurrence of the back lighting in that scene would be very high. So, the last-named device had also a drawback that the exposure could not be based on the illumination of the subject.

SUMMARY OF THE INVENTION

With the foregoing in mind, the present invention has been made, and its object is to provide a method of measuring light in a more sophisticated manner with a higher accuracy by dividing the field of a photosensor positioned to cover just the entire area of the image frame into a plurality of regions and computing the outputs of the regions to obtain an exposure value based on the one of various formulae which is automatically selected depending on the object distance and the focal length of the photographic lens.

Another object is to provide a light measuring device which operates with selection of modes depending on the image magnification.

Still another object is to provide a light measuring device in which the selection of modes is made by discriminating the size of a subject relative to the image frame.

A further object is to provide a light measuring device having a multiple segmented photosensor with the outputs from the segments being weighted as respective functions of the relative size of the subject.

Yet another object is to provide a light measuring device which selects a center-weighted mode in automatic response to setting of the camera of either an auto-focus or an AE lock exposure mode.

A further object is to provide a light measuring device in which the field of the photosensor is divided in such a fashion that a number of concentric segments, with their centers in exact or substantial coincidence with the center of the area of the image frame, are surrounded by the remaining area which is also divided into a number of segments.

These and other objects and features of the invention will become apparent from the following description of embodiments thereof by reference to the drawings.

DETAILED DESCRIPTION OF THE PREFERRED EMBODIMENTS

Figure 1:
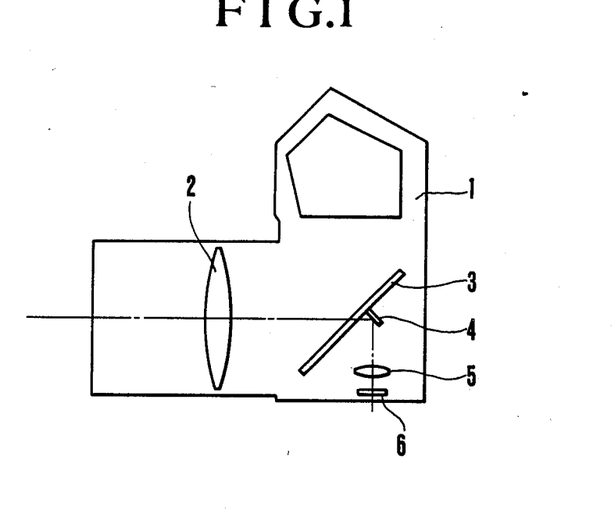
FIG. 1 is a schematic sectional view of a camera employing the light measuring device of the invention.

The present invention is next described in connection with embodiments thereof by reference to the drawings. In FIG. 1, a camera 1 has a photographic lens 2, a main mirror 3, a submirror 4 and an optical system 5 for a photosensor 6. Light passing through the lens 2 goes through part of the main mirror 3 and then is reflected by the submirror 4 to the optical system 5 by which an image is formed on the photosensor 6.

Figure 2:
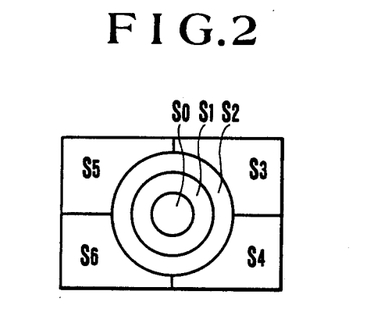
FIG. 2 is a plan view of a photosensor segmentation pattern used in the device of the invention.

FIG. 2 illustrates a segmentation pattern of the photosensor 6. The segments S0 to S6 each measure light individually.

Figure 3:
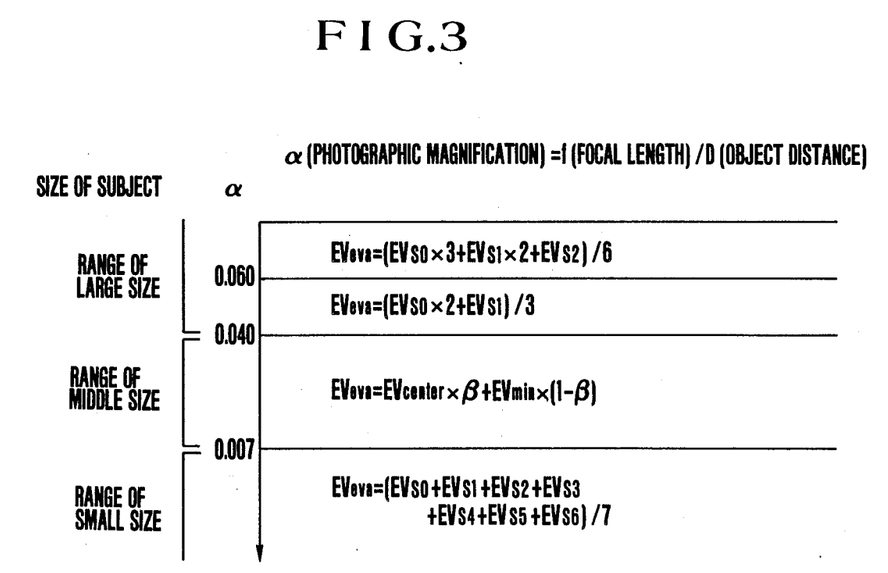
FIG. 3 is a diagram illustrating the realtionship of the sizes of a subject with the exposure value computing formulae.
Figure 4A:
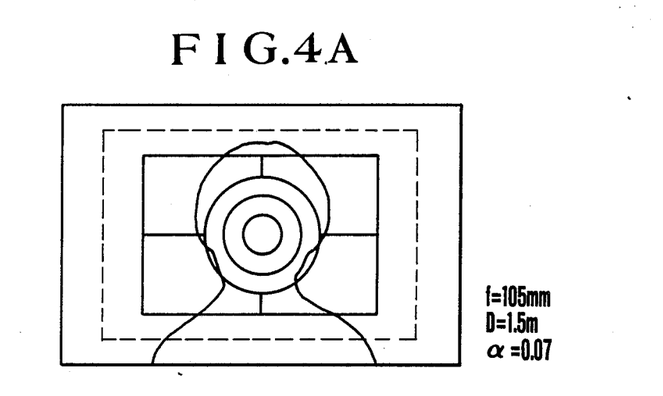
FIGS. 4A to 4C are pictorial illustrations of the variation of a person's image size with photographic magnification.

FIG. 3 is an algorithm for discriminating one scene from another by the distance from the camera to a subject of principal interest and the focal length of the zoom lens 1. From these two informations, a computer first obtains a photographic magnification $\alpha$, $\alpha \approx$ Focal length/Distance. In respect to the value of $\alpha$, the proportion of the size of the subject image to the entire area of the image frame is divided in to three, for example large, middle and small, rates. For each rate, a particular one of the following formulae for computing the brightness values $EV_{S0}$ to $EV_{S6}$, sensed by the above-described segments S0 to S6 of FIG. 2 to determine an exposure EVeva, is selected automatically. When $\alpha \approx 0.07$, 0.04 or 0.006, the proportion which an image of a person occupies in the field of view of the finder is depicted in FIGS. 4A to 4C respectively.

Figure 4B:
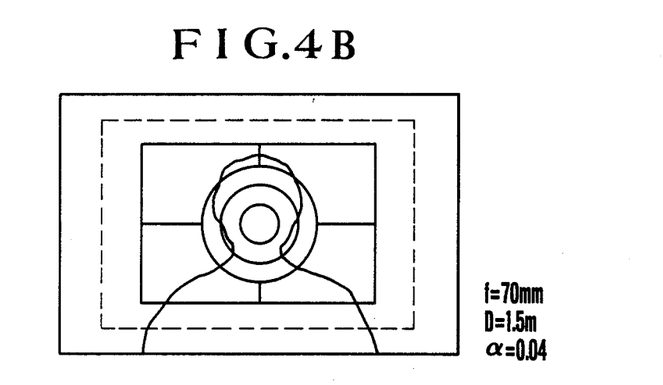

(1) A range of $\alpha \geq 0.04$ is defined in that, as shown in FIG. 4B, the size of the subject is equal to or larger than that of the area of the circle S2. For $\alpha \geq 0.06$, the size of the subject is defined as much larger, and use is made of $EVeva = (3EV_{S0} + 2EV_{S1} + EV_{S1})/6$.

And, for $0.06 > \alpha \leq 0.04$, $EVeva = (2EV_{S0} + EV_{S1})/3$.

Figure 4C:
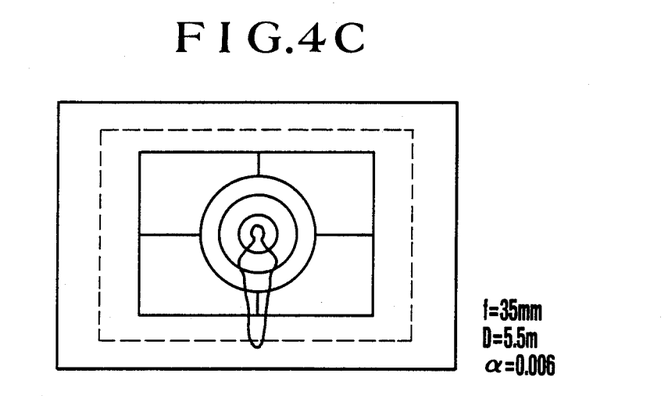

(2) Another range of $\alpha < 0.007$ is defined in that, as shown in FIG. 4C, the size of the subject is smaller than that of the area of the circle S0, and the average light measuring method can be employed. So, $EVeva = (EV_{S0} + EV_{S1} + EV_{S2} + EV_{S3} + EV_{S4} + EV_{S5} + EV_{S6})/7$.

Figure 5:
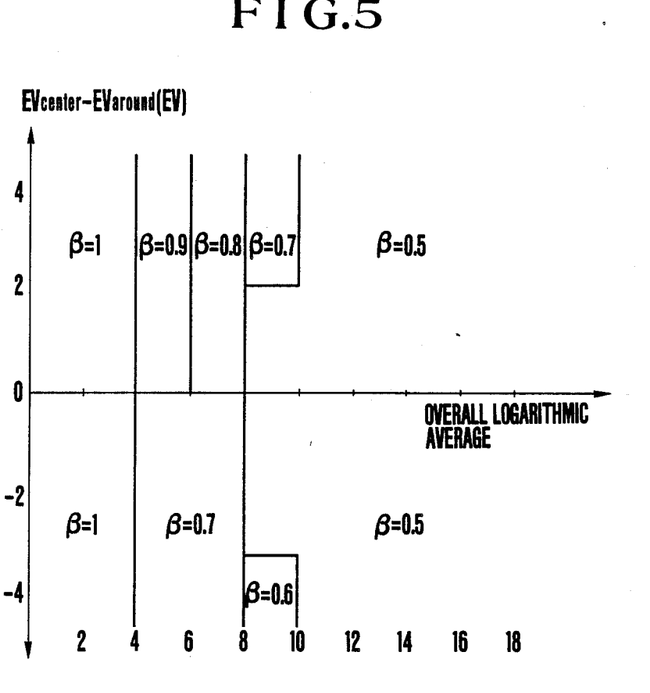
FIG. 5 is a graph illustrating how to evaluate the parameter $\beta$ of the computation formulae from the difference between the outputs of the corresponding segments of the photosensor to the subject and the environment surrounding it, and the logarithmic average of the sum of those outputs.

(3) Still another range of $0.04 > \alpha \geq 0.007$ is defined in that the size of the subject falls within a middle range of proportions, and, letting the smallest one of the $EV_{S0}$ to $EV_{S6}$ be denoted by EVmin and the output of a central area be expressed by $EVcenter = (2EV_{S0} + EV_{S1})/3$, $EVeva = \beta EVcenter + (1-\beta) EVmin$ is applied, where $\beta$ is the weight coefficient whose values are listed, as an example, in FIG. 5.

The chart of FIG. 5 shows, when the size of the subject is found to lie in the middle range according to the algorithm, how differences in the contrast between the subject and its background are compensated for in terms of the above-defined weight coefficient. As an exposure value based on the environment is computed by as formula: $EVaround = (EV_{S3} + EV_{S4} + EV_{S5} + EV_{S6})/4$, determination of the contrast of the scene in the form of a value of $\beta$ is made by using (EVcenter−EVaround) and the average of $EV_{S0}$-$EV_{S6}$ as variables. For example, with a scene having a low average brightness, when the background is dimmer than the subject, the value of $\beta$ is made larger with a greater emphasis on the outputs of the central segments of the photosensor. When the average brightness of the scene increases, the value of $\beta$ is decreased with a greater emphasis on the dimmest portion of the scene.

Figure 6:
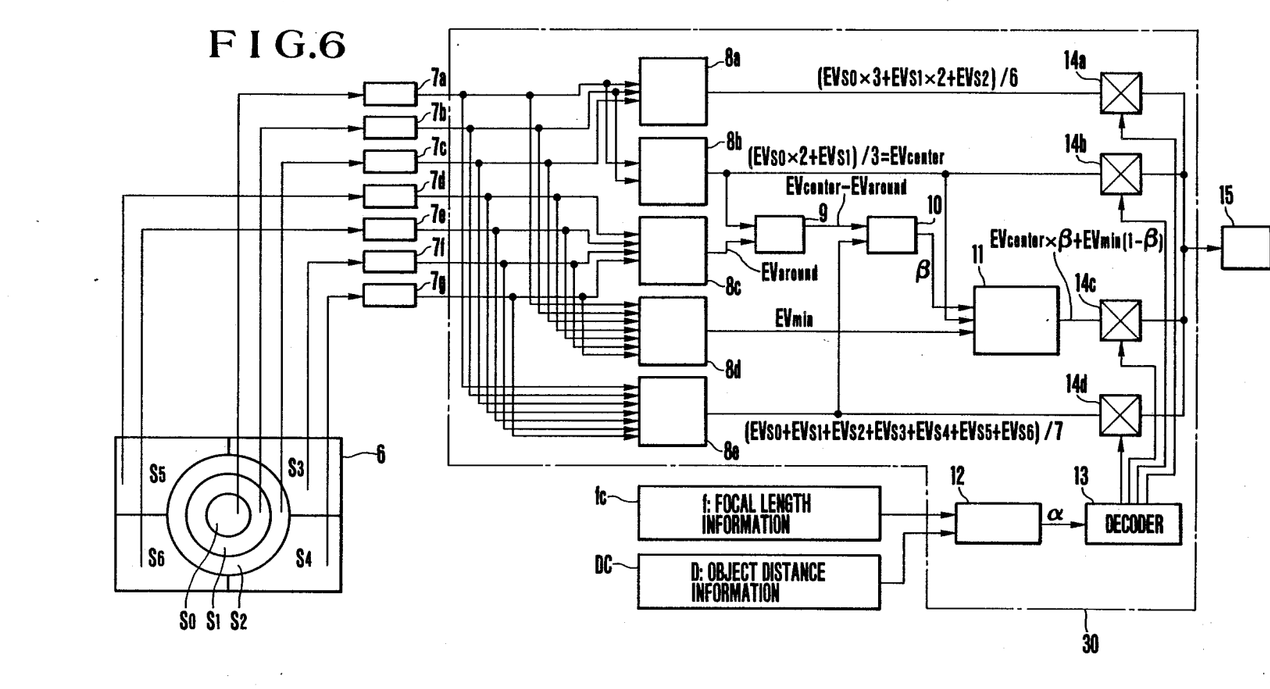
FIG. 6 is a block diagram of a first embodiment of the invention.
Figure 9:
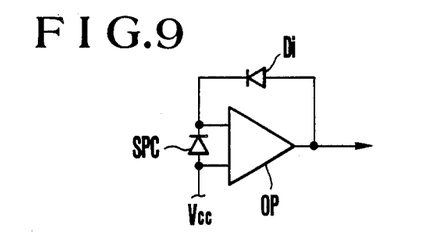
FIG. 9 is an electrical circuit diagram illustrating the details of each of the logarithmic compression circuits 7a to 7g of FIG. 6.

FIG. 6 is a block diagram illustrating a practical example of an exposure control system in the present invention. The above-described segments S0 to S6 are connected to logarighmic compression circuits 7a to 7g respectively. The logarithmic compression circuits 7a to 7g produce respective outputs $EV_{S0}$ to $EV_{S6}$ proportional to the logarithms of the brightnessess of the portions of the scene corresponding to the segments S0 to S6. Each of the logarithmic compression circuits 7a to 7g comprises, as shown in FIG. 9, an operational amplifier OP and a diode Di, the respective one of the segments (S0 to S6), or a silicon photocell SPC, being connected between the inputs of the operational amplifier OP, thus taking the known form of the amplifier for the photosensitive element. The outputs of the logarithmic compression circuits 7a to 7g are applied in such combinations to computer circuits 8e to 8e that the outputs of the computer circuits 8a to 8e represent the following exposure values:

8a: $(3EV_{S0} + 2EV_{S1} + EV_{S2})/6$

8b: $EVcenter = (2EV_{S0} + EV_{S1})/3$

8c: $Evaround = (EV_{S3} + EV_{S4} + EV_{S5} + EV_{S6})/4$

8d: EVmin, or the smallest value of the $EV_{S0}$ to $EV_{S6}$

8e: $(EV_{S0} + EV_{S1} + EV_{S2} + EV_{S3} + EV_{S4} + EV_{S5} + EV_{S6})/7$

A substraction circuit 9 receptive of the outputs of the computer circuits 8b and 8c produces an output representing EVcenter−EVaround. A $\beta$-evaluating circuit 10 is connected to the computer circuit 8e and 9 and, based on these two input data, produces a value of the weight coefficient $\beta$ according to the chart of FIG. 5. A computer circuit 11 is connected to the computer circuits 8b and 8d and the $\beta$-evaluating circuit 10, and computes these input data based on the following formula:

$$\beta EVcenter + (1-\beta)EVmin$$

The computer circuits 8a, 8b, 11 and 8e are connected to an exposure control circuit 15 through respective analog switches 14a to 14d which are selectively turned on, one at a time, by a decoder 13.

Connected to the input of the decoder 13 is the output of a computation control circuit 12, which receives informations from a focal length information forming circuit fc and an object distance information forming circuit DC and produces an output representing a value of the photographic magnification $\alpha$. Depending on the output of the computation control circuit 12, the decoder 13 controls the analog switches 14a to 14d as follows:

For $\alpha \geq 0.06$, the analog switch 14a turns on.

For $0.06 > \alpha \geq 0.04$, 14b turns on.

For $0.04 > \alpha \geq 0.007$, 14c turns on.

For $\alpha < 0.007$, 14d turns on.

In such a manner, the set of the analog switches 14a to 14d allows one of the outputs of the computer circuits 8a, 8b, 8e and 11, which is selected by the value of the photographic magnification, to pass to the exposure control circuit 15 therethrough.

This embodiment has the following advantages. In general, the subject comes to the center of the field of view with high probability. So the position of the subject can be somewhat limited to the center. Also, the size of the subject varies with the distance and the focal length as shown in FIGS. 4A to 4C. When the subject is small relative to the entire scene, as, for example, in landscape photography, the exposure is made not based on the brightness of the subject alone, but on a good balance over all brightnesses of the various portions of the scene, as has been described in paragraph (2). Therefore, the average light measuring mode is operated, and photographs which will be found acceptable by the photographer can be taken.

For large sizes of the subject image relative to the image frame as shown in FIGS. 4A and 4B, the size of the light measuring area is made to change with the change of the size of the subject image, as has been described in paragraph (1). This enables a subject of high contrast in itself to be exposed with an emphasis on good balance over the entire area of the subject alone. This or center weighted partial light measuring mode is made to operate over that central portion of the area of the image frame whcih is not reduced to less than a certain size shown at FIG. 4B, for example, thereby giving an advantage that even when the subject image takes its place more or less out of the center of the area of the image frame, its major sector can be even inscribed into the photosensitive area.

But, because of this, despite the photographer considers isolation of the brightness of the subject, while disregarding the brightnesses of its environment, the possibility of introduction of the brightness of the background into the brightness of the subject as the output of the central segments of the photosensor will increase considerably. If the background is dimmer than the subject, the output of the central segments will be little affected by the brightness of the background. On the other hand, if the background is brighter than the subject, the influence of the background on the output of the central segments becomes appreciable with the result being an under-exposure of the subject. So, in this embodiment, to solve this problem, for photographic situations where the brightness of the subject cannot be truely isolated from those of the environment, that is, the middle range of sizes of the subject between the values shown in FIGS. 4B and 4C, six different computation formulae are selectively operated with different contrasts between the subject and its background, as has been described in paragraph (3). When the subject is far brighter than the background, the center weighted partial light metering mode is automatically selected to operate. When the background is far brighter than the subject, the center weighted average light metering mode with a greater emphasis on the darkest portion of the subject is automatically selected to operate. For this, reason, against any sort of background, the exposure is made as suited to the subject as possible.

Figure 7:
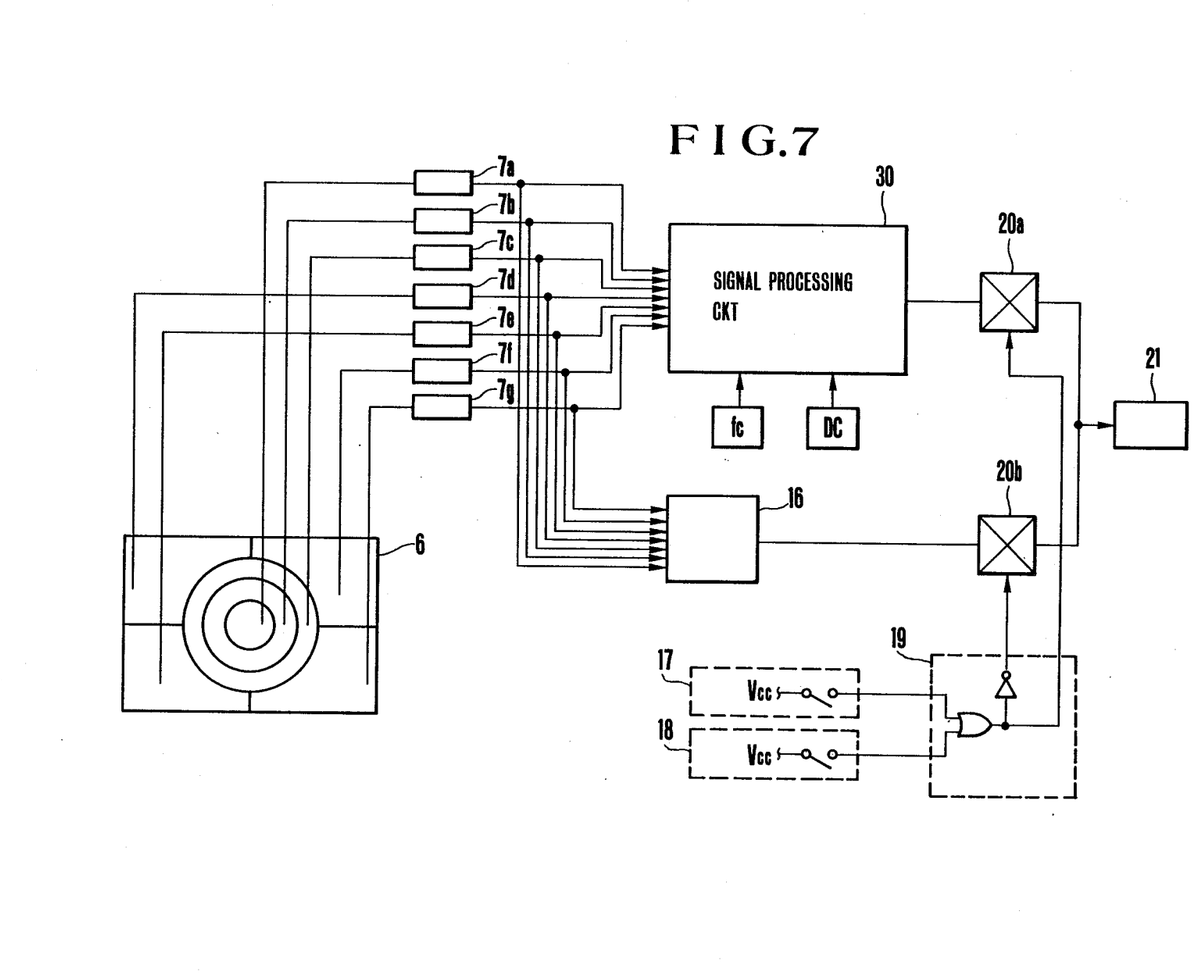
FIG. 7 is a block diagram of a second embodiment of the invention.

Another embodiment of the invention is described by reference to FIG. 7 where the light measuring device of the first embodiment is combined with an auto-focus mechanism or an AE lock mechanism. The outputs of the segments of the photosensor 6 are applied through the respective logarithmic compression circuits 7a to 7g to the signal processing circuit 30 shown in FIG. 6 where, after the same treatments as those described in connection with the first embodiment, one exposure value is derived. Meanwhile, an additional computer circuit 16 sums up all the outputs of the logarithmic compression circuits 7a to 7g after having been multiplied by respective different weights, and averages the total sum so that a center weighted average light metering aspect is formed. Whether or not the auto-focus mechanism AF is in use is determined by a detecting circuit 17 in the form of a switch arranged to turn on when an auto-focus start member is actuated. If in use, the switch 17 produces an output signal of high level. Whether or not the AE lock is in use is determined by a detecting circuit 18 in the form of a switch arranged to turn on when the AE lock is operated. If the AE is in lock, the switch 18 produces an output signal of high level. A decoder 19 comprises an OR gate having inputs connected to the outputs of the detecting circuits 17 and 18, and whose output is connected to the control input of an analog switch 20a and through an inverter to the control input of another analog switch 20b. When at least one of the signals from the two circuits 17 and 18 is high level, the decoder 19 turns on the analog switch 20a, leaving the other analog switch 20b turned off. Thereby the output of the signal processing circuit 30 is transmitted to the exposure control apparatus 21. When both switches 17 and 18 are open, the analog switch 20b is turned on and the other analog switch 20a is turned off, thereby the output of the computer circuit 16 is selected for transmission to the exposure control apparatus 21.

Such second embodiment has the following advantages. When in AE lock or before the start of auto-focusing, the photographer carries out framing usually with the subject at the center of the picture frame. Since, in this embodiment, the segmentation pattern of the photosensor 6 is so configured that when the subject lies at that center, as the major portion of the subject is inscribed just in one of the concentric round segments S0 to S3, a most proper exposure value can be derived, the percentage of the photographs taken with such usual framings in AE lock mode or AF mode which will be found acceptable can be remarkably increased, because the processing circuit 30 is operatively connected to the exposure control apparatus 21.

Figure 8:
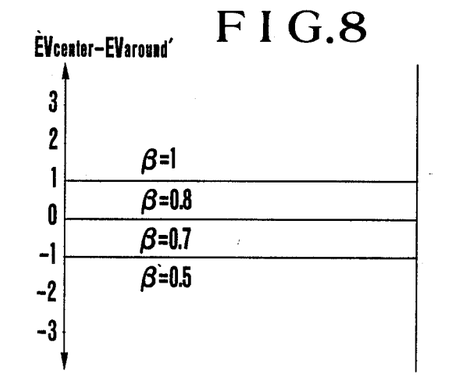
FIG. 8 is similar to FIG. 5 except that the values of the parameter $\beta$ are selected in another way.

FIG. 8 illustrates an example of variation of the chart of FIG. 5. In a chart of FIG. 8, as the photosensor of the same segmentation pattern as that shown in FIG. 2 is employed, the average of the sum of the corner segments, namely EVaround of FIG. 5 is replaced by another average of the sum of any two brightest outputs out of the outputs of the corner segments $EV_{S3}$ to $EV_{S6}$, which is here denoted by EVaround', and the value of the weight coefficient $\beta$ is varied as a function of only one variable, that is, EVcenter−EVaround'. Depending on the thus-obtained value of the weight coefficient $\beta$, the exposure value determined based on the formula EVeva=$\beta$EVcenter+(1−$\beta$) EVmin varies so that the light measuring method varies between the center weighted partial one and the center weighted average one with variable emphases on the lowest brightness.

Figure 10:
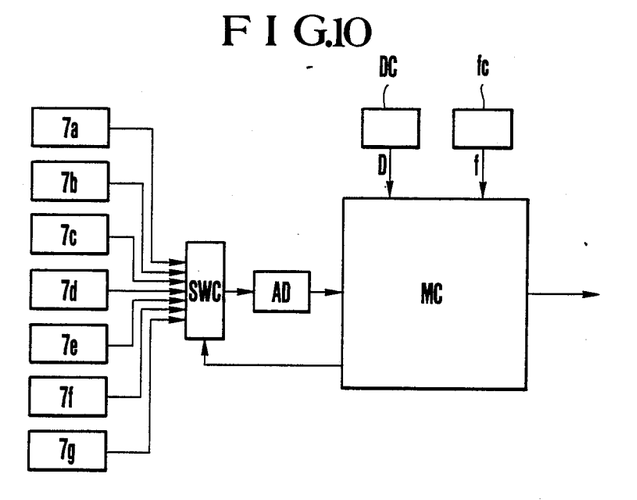
FIG. 10 is a block diagram of a third embodiment of the invention.

FIG. 10 illustrates an example of application of a microcomputer to the second embodiment of the invention shown in FIG. 6. Responsive to commands from the microcomputer MC, a switching circuit SWC successively selects the outputs from the logarithmic compression circuits 7a to 7g for application to an analog-digital (A/D) converter AD.

Figure 11A:
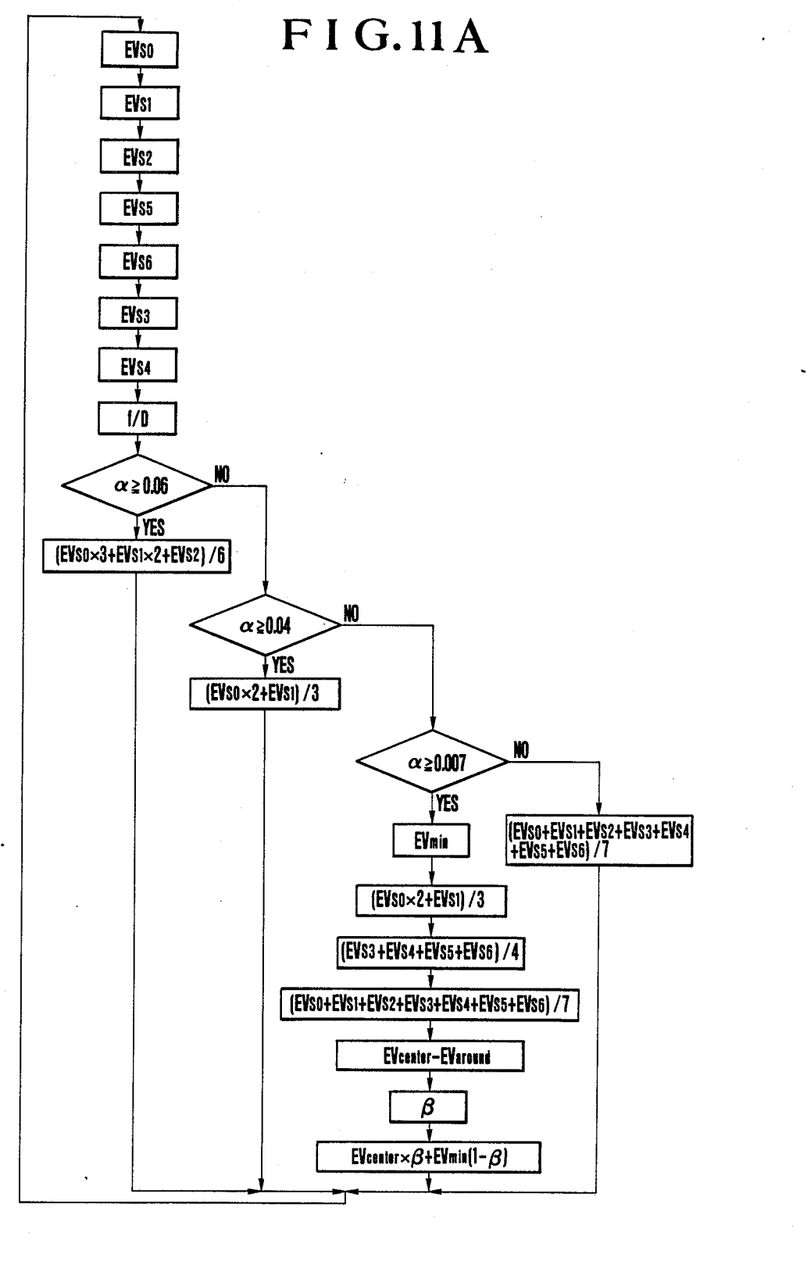
FIGS. 11A and 11B are flow charts illustrating the programs of a microcomputer MC of FIG. 10.
Figure 11B:
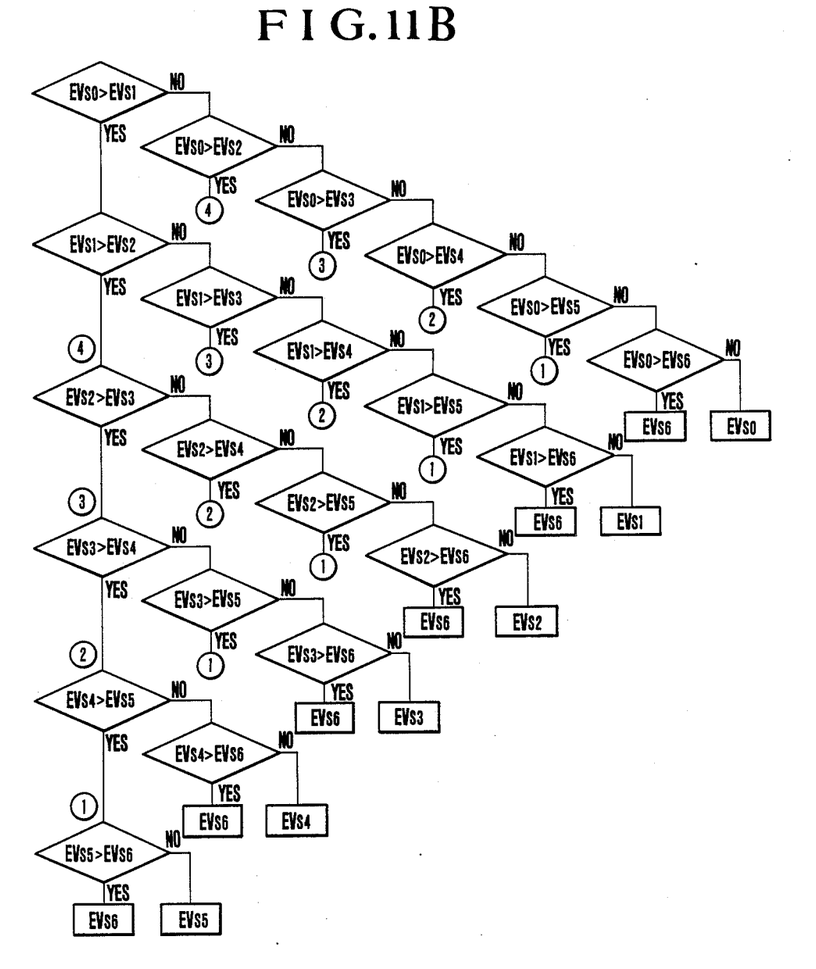

FIGS. 11A to 11B illustrates program flows in accordance which the microcomputer performs treatments.

The operation of the circuit of FIG. 10 is described by reference to the flows of FIGS. 11A and 11B. The microcomputer MC when rendered operative starts to operate the switching circuit SWC in such a manner that the outputs of the logarithmic circuits 7a to 7g are successively applied to the A/D converter AD. The A/D converter AD successively produces outputs corresponding outputs to the outputs of the logarithmic compression circuits 7a to 7g in digital form. These digital values are stored as the light values $EV_{S0}$ to $EV_{S6}$ in respective memory portions of the microcomputer MC. The subject distance information D and the focal length information f are used in the formula: f/D to compute a value of the photographic magnification $\alpha$. This value of $\alpha$ is then compared with 0.06. When $\alpha \geq 0.06$ is found, the light values $EV_{S0}$, $EV_{S1}$ and $EV_{S2}$ are selected from the stored light values in the aforesaid memory, and are computed based on the formula: $(3EV_{S0}+2EV_{S1}+EV_{S2})/6$. This computed value is made the exposure value.

For $\alpha<0.06$, it is then compared with 0.04. When $\alpha \geq 0.04$, the light values $EV_{S0}$ and $EV_{S1}$ are then used to perform the computation: $(2EV_{S0}+EV_{S1})/3$. The result is made the exposure value.

For $\alpha<0.04$, it is then compared with 0.007. When $\alpha \geq 0.007$ is found, which of the light values $EV_{S0}$ to $EV_{S6}$ is smallest is then sought by executing the program shown in the flowchart of FIG. 11B, or the EVmin is evaluated. Then, the light values $EV_{S0}$ and $EV_{S1}$ are used to perform the computation: $(2EV_{S0}+EV_{S1})/3=EV$center. Then, the light values $EV_{S3}$ to $EV_{S6}$ are used to perform the computation: $(EV_{S3}+EV_{S4}+EV_{S5}+EV_{S6})/4=EV$around. Then, all the light values are to perform the computation: $(EV_{S0}+EV_{S1}+EV_{S2}+EV_{S3}+EV_{S4}+EV_{S5}+EV_{S6})/7$, or to obtain the overall average. Then, the values of EVcenter and EVaround are substracted to determine EVcenter-EVaround. Plotting the thus-obtained values of EVcenter-EVaround and the overall average in the graph of FIG. 5, the computer finds out the value of $\beta$. Then based on the values of EVcenter and EVmin and further $\beta$, the $\beta$EVcenter$+(1-\beta)$ EVmin is performed to obtain the exposure value.

For $\alpha<0.007$, all the light values are called out from the memory to perform the computation: $(EV_{S0}+EV_{S1}+EV_{S2}+EV_{S3}+EV_{S4}+EV_{S5}+EV_{S6})/7$. The result is used as the exposure value.

As has been described above, according to the invention, the computing formula of the outputs of the multiple segmented photosensor is made to change not by the object distance alone, but by informations obtained as functions of the photographic magnification or the ratio of the focal length of the photographic lens to the object distance, and other variables, thereby giving an advantage that even in photographic situations in which the conventional light measuring device would be responsive in creatiing considerable exposure error of the subject, it is possible to ensure a proper exposure of the subject.

What is claimed is:

1. A camera having a light measuring device comprising:
   (a) a distance information circuit for forming object distance information;
   (b) a focal length information circuit for forming focal length information;
   (c) a light measuring circuit having a plurality of light measuring parts; and
   (d) a selection circuit for selecting an output of at least one of said light measuring parts of said light measuring circuit based on a combination of said distance information and said focal length information.

2. A camera according to claim 1, and further comprising a processing circuit which computes the output of each of said light measuring parts to form different computation output, said selection circuit selecting an operation mode of said processing circuit.

3. A camera according to claim 1, wherein said selection circuit selects the output of said light measuring part in accordance with a photographic magnification determined on the basis of said distance information and said focal length information.

4. A light measuring device, comprising:
   (a) a light measuring circuit having a plurality of light measuring portions, said circuit outputting an output corresponding to a logarithmic compression value of light incident on each of said portions; and
   (b) a weighting circuit for weighting outputs by multiplying the outputs corresponding to each of said portions by a factor predetermined for each output, said factor for each output being determined in accordance with focal length information or object distance information.

5. A light measuring device, comprising:
   (a) a light measuring circuit having a plurality of light measuring modes; and
   (b) a selecting circuit for selecting a predetermined mode out of said light measuring modes in accordance with the ratio of the area of an image of an object to that of a picture frame.

6. A light measuring device, for a camera having an auto-focus function for automatically shifting a photographic lens to an in-focus position by an automatic focusing device, said device measuring light within a photographic picture frame enclosing an image of an object and comprising:
   (a) selection means for selecting said auto-focus function:
   (b) light measuring circuit portions having a plurality of different light measuring modes including a first light measuring mode; and
   (c) mode determining means for forcibly selecting said first light measuring mode when said auto-focus function is selected by said selection means.

7. A light measuring device according to claim 6, wherein said first mode is a mode for determining a light measuring value based on a brightness information at a center part of the photographic frame.

8. A light measuring device for a camera having an auto-focus function for automatically shifting a photographic lens to an in-focus position by an auto-focus device and/or an AE lock function for effecting an exposure control at a time of photographing based on a light measuring value obtained by a photographer prior to a commencement of a picture taking, said light measuring device measuring light within a picture frame enclosing an object and comprising:
   (a) light measuring circuit portions having an evaluation light measuring mode in which light measuring outputs of said portions are weighted, and a not-weighted light measuring mode; and
   (b) first selection means for selecting the auto-focus function or the AE-lock function; and
   (c) second selection means for selecting said evaluation light measuring mode when the auto-focus function or the AE-lock function has been selected by said first selection means.

9. A light measuring device according to claim 8, wherein said not-weighted light measuring mode is an average light measuring mode.

10. A light measuring device for a camera having an auto-focus function for automatically shifting a photographic lens to an in-focus position by an auto-focus device and/or an AE lock function for effecting an exposure control at a time of photographing based on a light measuring value obtained by a photographer prior to a commencement of a picture taking, said light measuring device measuring light within a picture frame enclosing an object and comprising:
(a) a plurality of photosensitive element means for measuring light in segments of a picture frame;
(b) a processing circuit having a first mode in which an exposure value is sought by evaluating the output of said prescribed photosensitive element means, and a second mode in which an exposure value is sought by fixedly processing the output of a prescribed photosensitive element means;
(c) first selection means for selecting the auto-focus function or the AE-lock function; and
(d) second selection means for selecting the first mode when the auto-focus function of the AE-lock function has been selected by said first selection means.

11. A light measuring device, comprising:
(a) a light measuring circuit having a plurality of light measuring portions, each of which produces an output corresponding to a light incident thereon;
(b) means for determining a photographic magnification information; and
(c) a processing circuit for selecting an output from said light measuring parts based on said photographic magnification information and forming an exposure value based on said selected output, said photographic magnification being determined by combination of the object distance and the focal length.

12. A light measuring device, comprising:
(a) a light measuring circuit having a plurality of light measuring portions, wherein each of said portions produces an output corresponding to light incident on each of said portions, respectively;
(b) a weighting circuit for weighting outputs by multiplying the outputs from each of said portions by a factor predetermined for each output, said factor from each output being determined in accordance with the ratio of the area of an image of an object to that of a picture frame.

13. A light measuring device, comprising:
(a) a light measuring circuit having a plurality of light measuring parts, each of which produces an output corresponding to a light incident thereon; and
(b) a selection circuit for selecting an output from a plurality of light measuring parts in accordance with an object distance information.

14. A light measuring device according to claim 13, and further comprising a weighting circuit for weighting the output selected by said selecting circuit with a factor corresponding to said object distance information.

15. A light measuring device according to claim 13, and further comprising a computer circuit for performing a prescribed computation on the basis of the output selected by said selecting circuit, said computer circuit performing different computations in accordance with said object distance information.

16. A light measuring device for a camera having an AE lock function for effecting an exposure control at a time of photographing based on a light measuring value obtained by a photographer prior to commencement of a picture taking, said light measuring device measuring light within a picture frame enclosing an object and comprising:
(a) a light measuring circuit having a plurality of light measuring modes including a first mode in which a plurality of light receiving element portions of said light measuring circuit measure brightness in different regions of the picture frame in such a manner that a light measuring output from each light receiving element portion is calculated into a light measuring value to be outputted;
(b) first selection means for selecting the AE lock function; and
(c) second selection means for selecting said first mode out of said plurality of light measuring modes when the AE lock function has been selected by said first selection means.

17. A camera system having a view field forming a photographic picture frame enclosing an image of an object to be photographed, said camera having a light measuring device comprising:
(a) a distance information circuit for forming object distance information;
(b) a focal length information circuit for forming focal length information;
(c) light measuring portions having a plurality of light measuring modes; and
(d) a selection circuit for selecting the light measuring modes of said light measuring circuit portions based on said distance information and said focal length information, said light measuring circuit portions having a segmented photosensitive element portion including a plurality of concentric round light measuring patterns located substantially at a central portion of the picture frame, and a weighting portion for selecting prescribed light measuring pattern by said selection circuit and multiplying outputs of the selected patterns by a plurality of predetermined weights.

18. A light measuring device for a camera, comprising:
(a) a light measuring circuit having a plurality of light measuring parts, each of which produces an output corresponding to a light incident thereon;
(b) a computer circuit for selecting the output from each of said light measuring parts and performing computation in a plurality of different modes, said circuit having at least a first mode in which a light measuring value is obtained according to a first computation formula using an output from a prescribed light measuring part, and a second mode in which a light measuring value is obtained according to a second computation formula different from said first computation formula, using an output of a light measuring part other than the output of the light measuring part used for the first computation formula; and
(c) a selecting circuit for selecting the modes of the computer circuit based on said object distance information.

19. A light measuring device for a camera, comprising:

(a) a light measuring circuit having a plurality of light measuring parts, each of which produces an output corresponding to a light incident thereon;

(b) a computer circuit for selecting the output from each of said light measuring parts and performing computation in a plurality of different modes, said circuit having at least a first mode in which a light measuring value is obtained according to a first computation formula using an output from a prescribed light measuring part, and a second mode in which a light measuring value is obtained according to a second computation formula different from said first computation formula, using an output of a light measuring part other than the output of the light measuring part used for the first computation formula; and (c) a selection circuit for selecting the modes of the computer circuit based on the focal length information.

20. A light measuring device according to claim 19, wherein said selection circuit selects the modes in accordance with a combination of said focal length information and said object distance information.

21. A camera having a light measuring device having a plurality of light measuring patterns dividing a photographic picture frame into plural parts, comprising a selection circuit for selecting the light measuring patterns and changing the area of light measurement, said selection circuits selecting the light measuring pattern in accordance with a combination of object distance information and focal length information.

22. A camera according to claim 21, wherein said selection circuit selects the light measuring pattern in accordance with a photographic magnification determined by the object distance information and the focal length information.

23. A camera according to claim 21, wherein said selection circuit changes the area of light measurement by weighting the output of each light measuring pattern.

24. A camera according to claim 21, wherein said selection circuit selects the output of each light measuring pattern for use in the computation of a light measuring value.

25. A camera system having a view field forming a photographic picture frame enclosing an image of an object to be photographed, said camera having a light measuring device, comprising:

(a) a plurality of light measuring patterns for dividing the photographic picture frame; and (b) a weighting circuit for weighting each output of the light measuring patterns in accordance with a combination of an object distance and focal length.

* * * * *